United States Patent
Yamaguchi (10) Patent No.: US 10,690,593 B2
(45) Date of Patent: Jun. 23, 2020

(54) SAMPLE ANALYZER AND RECORDING MEDIUM RECORDING SAMPLE ANALYSIS PROGRAM

(71) Applicant: HORIBA, Ltd., Kyoto-shi, Kyoto (JP)

(72) Inventor: Tetsuji Yamaguchi, Kyoto (JP)

(73) Assignee: HORIBA, LTD., Kyoto (JP)

(*) Notice: Subject to any disclaimer, the term of this patent is extended or adjusted under 35 U.S.C. 154(b) by 211 days.

(21) Appl. No.: 15/345,766

(22) Filed: Nov. 8, 2016

(65) Prior Publication Data
US 2017/0138837 A1   May 18, 2017

(30) Foreign Application Priority Data

Nov. 13, 2015 (JP) ................................ 2015-223372

(51) Int. Cl.
  *G01N 21/51* (2006.01)
  *G01N 21/47* (2006.01)
  *G01N 15/02* (2006.01)

(52) U.S. Cl.
  CPC ......... *G01N 21/47* (2013.01); *G01N 15/0211* (2013.01); *G01N 21/51* (2013.01); *G01N 2015/0222* (2013.01)

(58) Field of Classification Search
  CPC .............. G01N 15/0211; G01N 29/50; G01B 9/02084; G01H 2250/135
  See application file for complete search history.

(56) References Cited

U.S. PATENT DOCUMENTS 5,453,841 A    9/1995  Reipa et al.
8,186,913 B2*  5/2012  Toner ................ B01D 21/0087
                                              356/246

(Continued)

FOREIGN PATENT DOCUMENTS

CN    105510192 A    4/2016
EP    1 176 636 A2   1/2002
(Continued)

OTHER PUBLICATIONS

Kätzel, Uwe, et al. "Dynamic light scattering for the characterization of polydisperse fractal systems: II. Relation between structure and DLS results." Particle & Particle Systems Characterization 25.1 (2008): 19-30.*

(Continued)

*Primary Examiner* — Rebecca C Bryant
(74) *Attorney, Agent, or Firm* — Lucas & Mercanti, LLP (57) ABSTRACT

The present invention is a sample analyzer 100 that makes it possible to accurately analyze a sample even when the sample is such as one in a state where particles are cross-linked, or one containing foreign bodies and that calculates an autocorrelation function from a detection signal obtained by irradiating a sample with inspection light L1, and from the autocorrelation function, analyzes the sample. In addition, the sample analyzer 100 includes: an autocorrelation function determination part 53 that determines whether or not the displacement amount of an autocorrelation function serving as a comparison target from an autocorrelation function serving as a reference is within a predetermined range; and a sample analysis part 54 that analyzes the sample with use of an autocorrelation function of which the displacement amount is determined by the autocorrelation function determination part 53 to be within the predetermined range.

9 Claims, 5 Drawing Sheets

(56) References Cited

U.S. PATENT DOCUMENTS

| | | | | |
|---|---|---|---|---|
| 8,705,040 | B2 * | 4/2014 | Trainer | G01B 11/08 356/338 |
| 2014/0056818 | A1 | 2/2014 | Krishnan et al. | |

FOREIGN PATENT DOCUMENTS

| | | | |
|---|---|---|---|
| GB | 982989 | A | 2/1965 |
| JP | H02-231673 | A | 9/1990 |
| JP | H09-33433 | A | 2/1997 |
| JP | 2000171384 | A | 6/2000 |
| JP | 2012194165 | A | 10/2012 |
| JP | 2015509136 | A | 3/2015 |
| WO | 99/51954 | A1 | 10/1999 |
| WO | 2013083637 | A1 | 6/2013 |
| WO | 2017/051149 | A1 † | 3/2017 |

OTHER PUBLICATIONS

Search Report dated May 11, 2017 from corresponding United Kingdom Patent Application No. GB 1619047.2; Total of 4 pages.
JPO, Office Action issued for the corresponding Japanese patent application No. 2016-218040, dated Dec. 3, 2019, with English translation (6 pages).
Popescu, G. et al., "Spatially resolved microrheology using localized coherence volumes", 8 pages (2002) Physical Review E. vol. 65.†
Zetasizer Nano Series User Manual, 250 pages (2013) Malvern Instruments Ltd.†
Katzel, Uwe, "Dynamic Light Scattering for the Characterization of Polydisperse Fractal Systems by the Example of Pyrogenic Silica", 209 pages (2007) Germany.†
Lorber, Bernard et al., "Protein Analysis by Dynamic Light Scattering: Methods and Techniques for Students", pp. 372-382 (2012) Biochemistry and Molecular Biology Education, vol. 40, No. 6.†

\* cited by examiner
† cited by third party

FIG.5

SAMPLE ANALYZER AND RECORDING MEDIUM RECORDING SAMPLE ANALYSIS PROGRAM

CROSS REFERENCE TO RELATED APPLICATION

This Application claims the priority of Japanese Patent Application No. JP 2015-223372 filed on Nov. 13, 2015, application which is incorporated herein by reference.

TECHNICAL FIELD

The present invention relates to a sample analyzer that analyzes a sample using an autocorrelation function.

BACKGROUND ART

Usually, as an instrument that measures the particle size distribution of particles dispersed in a solvent, as disclosed in Patent Literature 1, there is a sample measuring instrument that measures a particle size distribution using a dynamic light scattering method.

This particle size distribution measuring instrument includes: a light source adapted to irradiate particles, which are dispersed in a solvent and exhibit Brownian motion, with laser light; a light detector adapted to detect interference light of lights scattered by the particles; and a calculation part adapted to obtain an autocorrelation function from a detection signal of the light detector to measure the particle size distribution.

However, in the case of any of a state where particles mutually contact or mutually connect and liquid interposes between them and a state where the shape of particles is thin thread-like and the thread-like particles mutually tangle to form a net-like structure (these states are called gel states), due to uneven internal structure, a specific autocorrelation function is obtained depending on an irradiation site irradiated with the laser light, and as a result, a sample cannot be accurately analyzed. Also, when foreign bodies different from the particles as a measurement target are contained in the solvent as well, the foreign bodies irradiated with the laser light prevents the sample from being accurately analyzed because the resulting autocorrelation function is different from a proper autocorrelation function of the measurement target particles.

CITATION LIST

Patent Literature

[Patent Literature 1] Japanese Unexamined Patent Publication JP-A 2000-171384

SUMMARY OF INVENTION

Technical Problem

Therefore, the present invention is made in order to solve the above-described problems, and the principal object thereof is to make it possible to accurately analyze a sample even when the sample is such as one in a state where particles are cross-linked, or one containing foreign bodies.

Solution to Problem

That is, a sample analyzer according to the present invention is a sample analyzer that calculates an autocorrelation function from a detection signal obtained by irradiating a sample with inspection light, and from the autocorrelation function, analyzes the sample. In addition, the sample analyzer includes: an autocorrelation function determination part that determines whether or not the displacement amount of a comparison target function, which is an autocorrelation function obtained from the sample and serving as a comparison target, from a reference function, which is an autocorrelation function serving as a reference, is within a predetermined range; and a sample analysis part that analyzes the sample with use of a comparison target function of which the displacement amount is determined by the autocorrelation function determination part to be within the predetermined range.

Since the sample analyzer as described above analyzes the sample with use of the comparison target function of which the displacement amount from the reference function is determined to be within the predetermined range, inappropriate autocorrelation functions such as specific autocorrelation functions and autocorrelation functions affected by foreign bodies can be eliminated to accurately analyze the sample.

As a specific method for the determination made by the autocorrelation function determination part, it is desirable that the autocorrelation function determination part determines whether or not the displacement amount of the comparison target function from the reference function is within the predetermined range over a predetermined time range.

By comparing the reference function and the comparison target functions over the predetermined time range (interval or width) as described, the sample can be analyzed using a more appropriate autocorrelation function.

It is desirable that the reference function is an autocorrelation function obtained by measuring a reference sample different from the sample or an autocorrelation function obtained by performing measurement with use of the sample.

Note that as the autocorrelation function obtained by measuring the reference sample, in addition to an autocorrelation function obtained by measuring the reference sample in advance, an autocorrelation function of the reference sample having been measured in the past and stored (e.g., databased) in the memory is also possible. By using the autocorrelation function of the reference sample as described, the measurement target sample can be identified. Also, when the sample analyzer is one having a database, the measurement target sample can be more accurately identified using autocorrelation functions of various types of reference samples included in the database. Further, by using the autocorrelation function of the reference sample having been measured in the past, a temporal change of the measuring target sample, a state during actual measurement, and the like can be analyzed.

As the autocorrelation function obtained by performing the measurement with use of the sample, in addition to the autocorrelation function obtained by measuring the sample in advance, an autocorrelation function of the same sample as the sample having been measured in the past, which is stored (e.g., databased) in the memory, is also possible. By using the autocorrelation function of the sample as described, a reference function suitable for the sample can be prepared, and therefore a more appropriate autocorrelation function (a comparison target function of which the displacement amount is within the predetermined range) can be obtained to accurately analyze the sample. Further, by using the autocorrelation function of the sample having been measured in the past as the reference function, a temporal change of the measurement target sample, a state during actual measurement, and the like can be analyzed. In addition, the autocorrelation function of the sample used to obtain the reference function may be used for the analysis, and this makes it possible to use the autocorrelation function without waste to improve the efficiency of measurement.

It is desirable that the sample analyzer is one that analyzes the sample by irradiating multiple points of the sample with the inspection light, in which the autocorrelation function determination part uses a reference function corresponding to each of the multiple points to determine a comparison target function at that point.

Since the determination is made using a reference function corresponding to each of the multiple points as described, an appropriate autocorrelation function (a comparison target function of which the displacement amount is within the predetermined range) can be obtained at that point to accurately analyze the sample.

In this case, it is conceivable that the sample analysis part analyzes the sample by taking the ensemble average of comparison target functions of which the displacement amounts are determined to be within the predetermined range at the respective points.

As a specific measurement process, it is desirable to perform pre-measurement adapted to obtain the reference function from the sample, and after the premeasurement, main measurement adapted to obtain the comparison target function from the sample.

Note that in the main measurement, the same position as an irradiation position used to perform the pre-measurement is irradiated with the inspection light. Also, in the main measurement, multiple comparison target functions are obtained at the same irradiation position. In addition, the autocorrelation function determination part compares the multiple comparison target functions and the reference function. The sample analysis part takes the average value of, among the multiple comparison target function, comparison target functions of which the displacement amounts are within the predetermined range. Then, the sample analysis part analyzes the sample using the averaged autocorrelation function.

As an embodiment adapted to make the effect of the present invention remarkable, it is desirable that the sample is gel and the sample analysis part is one that analyzes the lattice spacing of the gel or the hardness of the gel.

It is desirable that the sample analyzer includes: a measurement cell adapted to contain the sample; and an irradiation position changing mechanism adapted to change the irradiation position of the inspection light with respect to the measurement cell.

Advantageous Effects of Invention

According to the present invention configured as described above, since the sample is analyzed using the comparison target functions of which the displacement amounts from the reference function are determined to be within the predetermined range, inappropriate autocorrelation functions such as specific autocorrelation functions and autocorrelation functions affected by foreign bodies can be eliminated to accurately analyze the sample.

DESCRIPTION OF EMBODIMENTS

In the following, one embodiment of a sample analyzer according to the present invention will be described with reference to the drawings.

A sample analyzer 100 of the present embodiment is one that analyzes a sample using a dynamic light scattering method (a photon correlation method). Note that the sample to be measured by the sample analyzer 100 is a sample required to be measured at multiple points while changing a measurement position, specifically a sample having non-ergodicity (a non-ergodicity sample (a sample of which temporal and ensemble averages are different)). The sample analyzer 100 of the present embodiment is one that analyzes the structure of gel, such as a lattice spacing (mesh size) and the physical properties of the gel, such as hardness.

Figure 1:
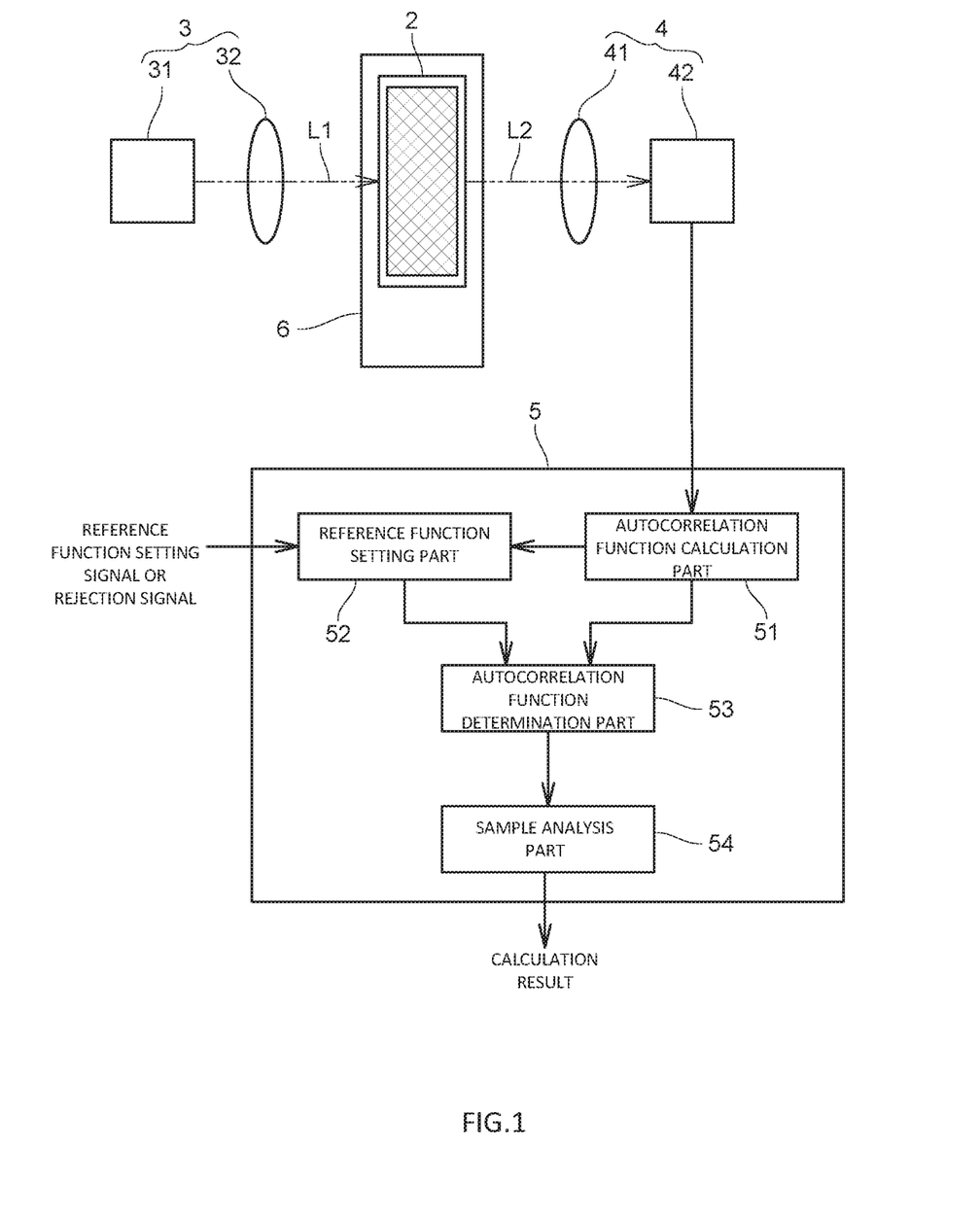
FIG. 1 is a diagram illustrating the configuration of a sample analyzer according to one embodiment of the present invention.

Specifically, as illustrated in FIG. 1, the sample analyzer 100 includes: a measurement cell 2 adapted to contain the sample; a light irradiation part 3 adapted to irradiate the measurement cell 2 with inspection light L1; a light detecting part 4 adapted to detect scattered light L2 from the measurement cell 2; and information processing device 5 adapted to analyze the sample by performing a calculation process on a light intensity signal (a detection signal) outputted from the light detecting part 4.

The measurement cell 2 is formed of a translucent material. The measurement cell 2 may be a batch type measurement cell or a flow type measurement cell having introduction and lead-out ports respectively connected to external pipes.

The light irradiation part 3 includes a laser 31, an optical system 32 adapted to perform focusing and/or the like of laser light from the laser 31, and the like. Also, the light detecting part 4 includes: an optical system 41 adapted to perform focusing and/or the like of interference light of scattered lights from the sample; a light detector 42 adapted to convert the interference light focused by the optical system 41 into an electrical detection signal; and the like.

In addition, the present embodiment is configured to be able to irradiate multiple points of the sample contained in the measurement cell 2 with the inspection light L1. Specifically, the present embodiment includes an irradiation position changing mechanism 6 adapted to change the irradiation position of the inspection light L1 with respect to the measurement cell 2. As a possible configuration of the irradiation position changing mechanism 6, it is conceivable to fix the light irradiation part 3 and the light detecting part 4 and moves the measurement cell 2. In this case, it is configured to move the measurement cell 2 in a multistep manner along a direction crossing the light path of the inspection light L1. In addition, as a specific example of the irradiation position changing mechanism 6, the irradiation position changing mechanism 6 includes: a linear motion mechanism adapted to hold the measurement cell 2 at least two-dimensionally slidably; and an actuator adapted to move the measurement cell 2 held by the linear motion mechanism, such as a motor or an air cylinder.

Figure 2:
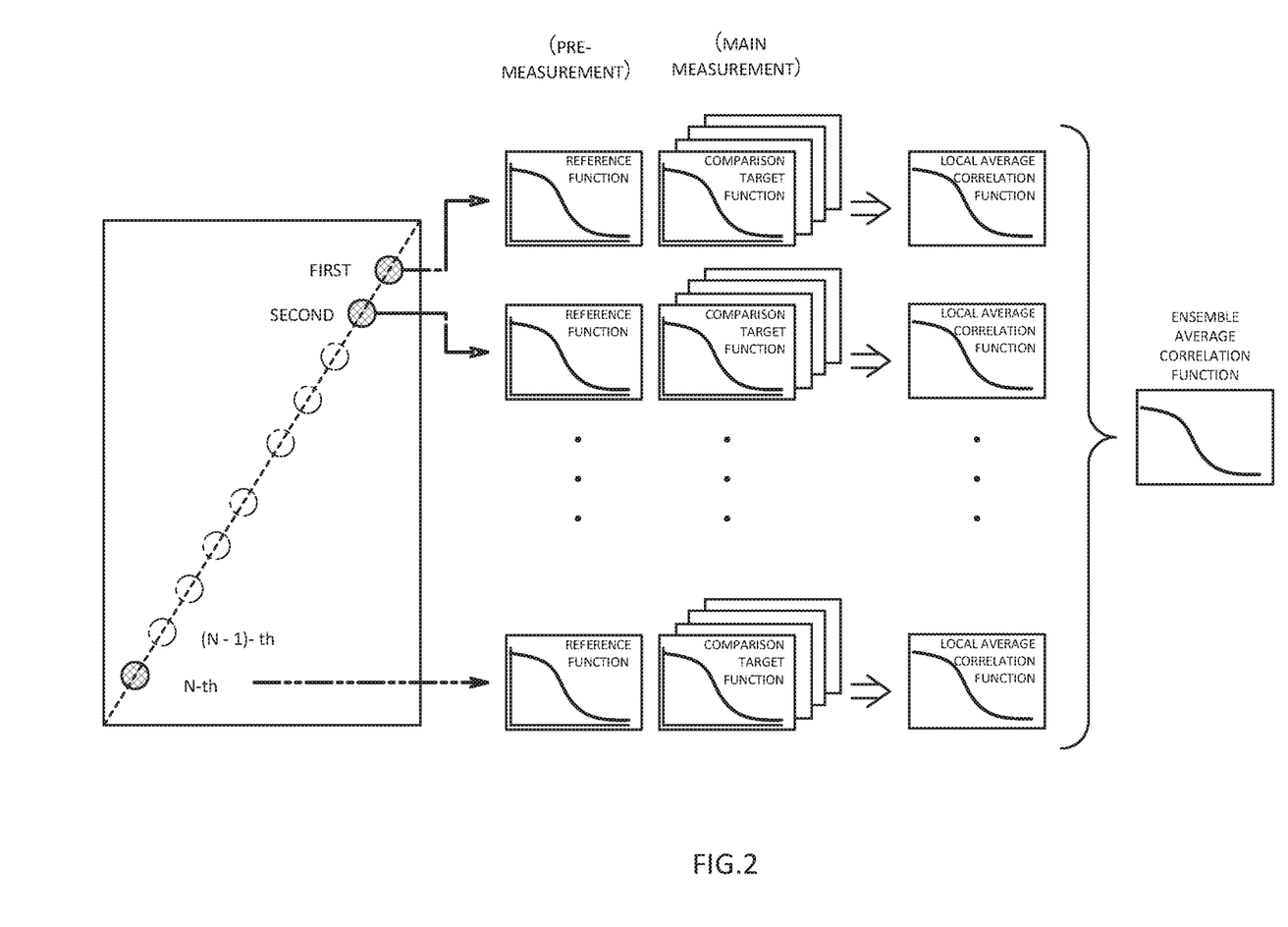
FIG. 2 is a schematic diagram illustrating a sample analysis process in the same embodiment.

Also, the irradiation position changing mechanism 6 moves the measurement cell 2 in a top-bottom direction and in a left-right direction such that as illustrated in FIG. 2, on a rectangular-shaped light incident surface of the measurement cell 2, for example, N points on a diagonal line are irradiated with the inspection light L1. Note that the multiple irradiation positions are not limited to ones on the diagonal line, but may be multiple points arrayed in a matrix or multiple points on a linear line in the top-bottom or left-right direction.

Alternatively, it may be configured to fix the measurement cell 2 and move the light irradiation part 3 and the light detecting part 4. Still alternatively, it may be configured to mutually relatively move the measurement cell 2, and the light irradiation part 3 and the light detecting part 4.

The information processing device 5 is one adapted to analyze the structure and physical properties of gel and function as an autocorrelation function calculation part 51, reference function setting part 52, autocorrelation function determination part 53, sample analysis part 54, and the like. In addition, the information processing device 5 is a dedicated or general-purpose computer having a CPU, an internal memory, an input/output interface, an input part such as a keyboard, a display part such as a display, and the like, and functions as the respective part 51 to 54 described above by installing a sample analysis program of the present invention in the internal memory.

The autocorrelation function calculation part 51 acquires a detection signal outputted from the light detecting part 4 (the light detector 42). Then, the autocorrelation function calculation part 51 performs Fourier transformation of the acquired detection signal to obtain a power spectrum, and performs inverse Fourier transformation of the power spectrum to obtain an autocorrelation function of the detection signal. Also, the autocorrelation function calculation part 51 obtains an autocorrelation function at each irradiation position changed by the irradiation position changing mechanism 6.

The reference function setting part 52 is one adapted to set an autocorrelation function (hereinafter referred to as a reference function) serving as a reference for sorting out autocorrelation functions used for the sample analysis. Also, the reference function setting part 52 sets a reference function at each irradiation position changed by the irradiation position changing mechanism 6. Further, the reference function setting part 52 sets a reference function using an autocorrelation function obtained at each irradiation position by the autocorrelation function calculation part 51. A specific method for the setting will be described later.

The autocorrelation function determination part 53 is one adapted to compare a reference functions set by the reference function setting part 52 and autocorrelation functions (hereinafter referred to as comparison target functions) that are other than the reference function and calculated by the autocorrelation function arithmetic part 51, and determine whether or not the displacement amount of each of the comparison target functions from the reference function are within a predetermined range. In the present embodiment, the autocorrelation function determination part 53 compares the reference function and the comparison target functions at each irradiation position.

A specific method for the comparison is one that compares the reference function and each of the comparison target functions within a predetermined delay time range.

Note that the predetermined delay time range refers to a predetermined range of delay time (correlation time) $\tau$ ($\mu s$) as the horizontal axis of an autocorrelation function graph or the logarithm of the delay time (log [$\tau$ ($\mu s$)]). In addition, as the unit of the delay time $\tau$ as the horizontal axis, in addition to $\mu s$, any unit can be used.

In the present embodiment, the reference function and each of the comparison target functions are compared over the entire range from the minimum value (horizontal axis minimum point) of the delay time $\tau$ or the logarithm of the delay time to the maximum value (horizontal axis maximum point) of the delay time $\tau$ or the logarithm of the delay time at each irradiation position. Note that the predetermined delay time range may be part of the entire range from the minimum value (horizontal axis minimum point) of the delay time $\tau$ or the logarithm of the delay time $\tau$ to the maximum value (horizontal axis maximum point) of the delay time $\tau$ or the logarithm of the delay time $\tau$.

Also, a specific method for the determination is one that determines whether or not at each delay time t, the displacement amount of each of the comparison target functions from the reference function is within a predetermined threshold value range.

Note that the predetermined threshold value used at each delay time $\tau$ is, for example, a value within a range of $\pm X$ % of the reference function.

As the predetermined threshold value in the present embodiment, $\pm X$ % of the value of the reference function at a predetermined delay time $\tau_0$ can be used as a representative value for the determination at each delay time $\tau$. Note that $\pm X$ % of the value of the reference function at each delay time $\tau$ may be set as the predetermined threshold value at each delay time $\tau$ however, in this case, the predetermined threshold value is different among respective delay times $\tau$.

Figure 3:
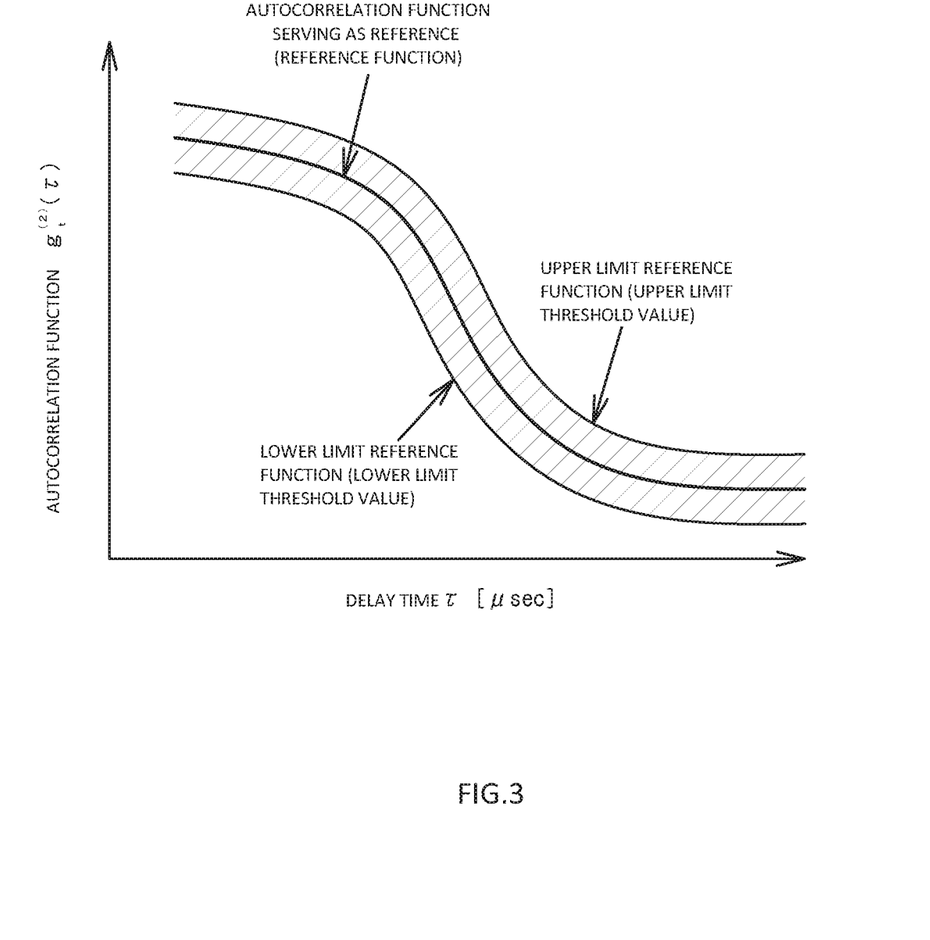
FIG. 3 is a diagram illustrating the relationship between a reference function and threshold values in the same embodiment.

As illustrated in FIG. 3, assuming that an autocorrelation function resulting from adding X % of the reference function at the predetermined delay time $\tau$ to the reference function is set as an upper limit threshold value, and an autocorrelation function resulting from subtracting X % of the reference function at the predetermined delay time $\tau$ from the reference function is set as a lower limit threshold value, when the displacement amount is within the predetermined threshold value range, the comparison target function is included in the range between the upper limit threshold value and the lower limit threshold value. In this case, the range between the upper limit threshold value and the lower limit threshold value has a certain width along the horizontal axis. Note that the range between the upper limit threshold value and the lower limit threshold value may have a width that changes along the horizontal axis.

In addition, as is clear from FIG. 3, the autocorrelation function determination part 53 may be adapted to set the autocorrelation function resulting from adding X % of the reference function to the reference function as the upper limit reference function to determine whether or not the comparison target function is less than the upper limit reference function, and set the autocorrelation function resulting from subtracting X % of the reference function from the reference function as the lower limit reference function to determine whether or not the comparison target function is larger than the lower limit reference function. Alternatively, it may be adapted to mutually differentiate a threshold value ($X_1$%) in the case where the comparison target function is larger than the reference function ("reference function"–"comparison target function"<0) and a threshold value ($X_2$%) in the case where the comparison target function is smaller than the reference function ("reference function"–"comparison target function">0).

Another method for determining whether or not the displacement amount of each of the comparison target functions from the reference function is within the predetermined threshold value range is one that obtains a correlation coefficient (corresponding to the displacement amount) between the shape of the waveform of the reference function and the shape of the waveform of the comparison target function. In this case, the correlation coefficient between the value of the reference function and the value of that comparison target function at the predetermined delay time τ is obtained. Then, it is determined whether or not the correlation coefficient is within a predetermined range equal to or more than, for example, 0.8. In the case of gel, since the internal structure of the gel is uneven, the density of the gel may be high or low even though the net-like structure of the gel is the same. Between simply offset autocorrelation functions, the density of gel is different even though the net-like structure of the gel is the same. For this reason, when analyzing the structure of gel, by making a determination on the basis of the correlation coefficient, as compared with the above-described case of comparing the comparison target function with the upper limit threshold value and/or the lower limit threshold value, the number of autocorrelation functions usable for the analysis can be increased to improve the accuracy of the analysis and also an analysis time can be shortened.

The sample analysis part 54 acquires comparison target functions of which the displacement amounts from the reference function at each irradiation position are determined to be within the predetermined range. In the present embodiment, the sample analysis part 54 is configured to acquire the multiple comparison target function at each irradiation position, and calculates the average value of the multiple comparison target functions at each irradiation position (hereinafter referred to as a local average autocorrelation function). Also, the sample analysis part 54 uses local average autocorrelation functions calculated at the respective multiple irradiation positions to calculate an ensemble average autocorrelation function $g_{en}^{(1)}(\tau)$ in accordance with the following expression.

$$g_{en}^{(1)}(\tau) = \frac{\left\langle \langle I \rangle_t \sqrt{1 + g_t^{(2)}(\tau) - g_t^{(2)}(0)} \right\rangle_{en}}{\langle\langle I \rangle_t\rangle_{en}} \quad \text{[Expression 1]}$$

In the expression above, $g_{en}^{(1)}(\tau)$ represents the local average autocorrelation function obtained at each irradiation position.

$<I>_t$ represents the count rate [kCPS] of the local average autocorrelation function obtained at each irradiation position. Note that the count rate is the number of lattice pulses per second detected by the light detecting part in the photon correlation method and is proportional to detected scattered light intensity. The count rate of the local average autocorrelation function refers to the count rate of the averaged multiple comparison target functions.

The symbol $<>_{en}$ indicates the average value of m (natural number≤N) pieces of data used for the ensemble averaging.

Further, the sample analysis part 54 uses the ensemble average correlation function to calculate the lattice spacing (mesh size), the relaxation rate Γ (μsec−1), or the like of the sample gel. For example, the sample analysis part 54 calculates the average value, mode value, or standard deviation of lattice spacings, the average value, mode value, or standard deviation of the relaxation rate Γ, or the like. Note that the relaxation rate Γ can be obtained from a diffusion constant D and a scattering vector q using $\Gamma=Dq^2$.

Figure 4:
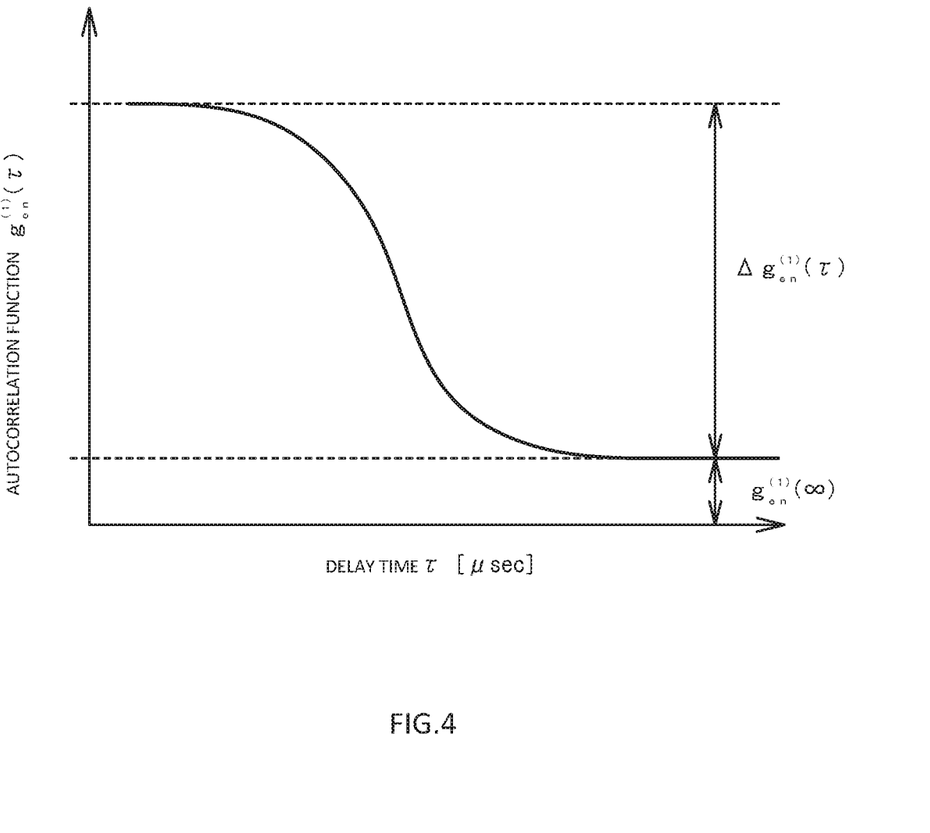
FIG. 4 is a diagram illustrating the dynamic component and minimum value of an ensemble average autocorrelation function.

Specifically, the sample analysis part 54 calculates the average value, mode value, or standard deviation of the lattice spacings, the average value, mode value, or standard deviation of the relaxation rate Γ, or the like using the dynamic component $\Delta g_{en}^{(1)}(\tau)$ (see FIG. 4) of the ensemble average correlation function $g_{en}^{(1)}(\tau)$, which is given by the following expression.

$$\Delta g_{en}^{(1)}(\tau) = \frac{g_{en}^{(1)}(\tau) - g_{en}^{(1)}(\infty)}{g_{en}^{(1)}(0) - g_{en}^{(1)}(\infty)} \quad \text{[Expression 2]}$$

In the expression above, $g_{en}^{(1)}(\infty)$ represents the convergence value (minimum value) of the ensemble average correlation function as illustrated in FIG. 4.

Still further, the sample analysis part 54 calculates the hardness of the gel from the convergence value $g_{en}^{(1)}(\infty)$ of the ensemble average correlation function. For example, the sample analysis part 54 preliminarily has the relational expression between a convergence value $g_{en}^{(1)}(\infty)$ and hardness, and by substituting the convergence value $g_{en}^{(1)}(\infty)$ into the relational expression, calculates the hardness.

Yet further, the sample analysis part 54 displays, or switches to and displays the results of the calculation on the same screen of an unillustrated display part (e.g., a display) side by side. As a configuration for displaying the calculation results, it is conceivable to display the calculation results, for example, in a graphic form or a tabular form on a measurement item basis. Alternatively, depending on a measurement item, multiple types of measurement items may be displayed superposed on the same graph.

Figure 5:
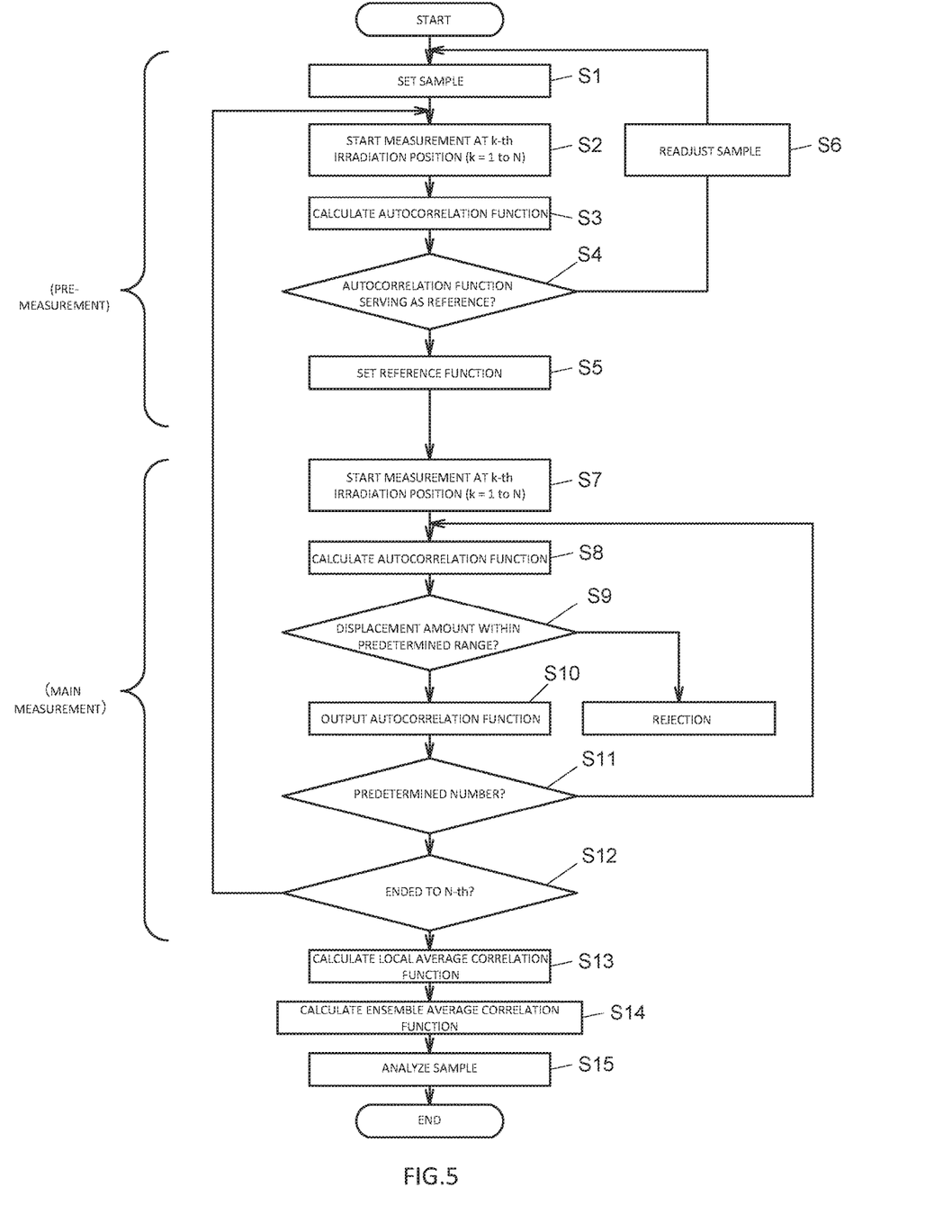
FIG. 5 is a diagram illustrating an analysis flowchart in the same embodiment.

Next, a sample measurement method using the sample analyzer will be described with reference to FIGS. 2 and 5.

The measurement cell 2 of a batch type containing the sample is set in the sample analyzer 100 (Step S1). Note that in the case where the measurement cell is of a flow type, the sample is introduced into the measurement cell 2.

<Pre-Measurement>

Measurement for acquiring a reference function at the first irradiation position among the multiple irradiation positions is started (Step S2). The autocorrelation function calculation part 51 calculates an autocorrelation function at the first irradiation position. Then, the autocorrelation function calculation part 51 outputs the autocorrelation function to the reference function setting part 52 (Step S3).

The reference function setting part 52 displays the autocorrelation function obtained in Step S3 on the unillustrated display part (e.g., a display) in order to make a user select whether or not to set the autocorrelation function as a reference function. The user views the autocorrelation function outputted on the display part to determine whether or not to set the autocorrelation function as a reference (Step S4). When the user determines to set the autocorrelation function as a reference, the user inputs a reference function setting signal through unillustrated input means. The reference function setting part 52 having received the reference function setting signal sets the displayed autocorrelation function as the reference function (Step S5).

On the other hand, when the user determines not to set the displayed autocorrelation function as the reference, the user inputs a rejection signal through the input means. When the reference function setting part 52 receives the rejection signal, the sample analyzer 100 returns to a waiting state, and for example, the reference function setting part 52 displays on the display part a display prompting the readjustment of the sample (Step S6). Alternatively, it may be adapted to abandon the acquisition of the autocorrelation function at the first irradiation position and start measurement for acquiring a reference function at the second irradiation position.

<Main Measurement>

After the reference function setting part 52 has set the reference function at the first irradiation position in Step S5, measurement for acquiring comparison target functions at the first irradiation position is started (Step S7). The autocorrelation function calculation part 51 calculates an autocorrelation function at the first irradiation position and outputs the autocorrelation function to the autocorrelation function determination part 53 (Step S8).

The autocorrelation function determination part 53 compares the autocorrelation function (comparing target function) acquired at the first irradiation position with the reference function to determine whether or not the displacement amount of the autocorrelation function is within the predetermined range (Step S9). Note that the autocorrelation function determination part 53 outputs to the sample analysis part 54 only a comparison target function of which the displacement amount is within the predetermined range (Step S10). These processing steps (S8 to S10) are repeated, and when a predetermined number of (e.g., 10) comparison target functions of which the displacement amounts are determined to be within the predetermined range are acquired at the first irradiation position, the acquisition of autocorrelation functions at the first irradiation position is ended (Step S11).

Note that when the predetermined number of (e.g., 10) comparison target functions of which the displacement amounts are determined to be within the predetermined range cannot be acquired even after the above processing steps (S8 to S19) have been repeated predetermined times, the acquisition of autocorrelation functions at the first position may be abandoned to shift to the acquisition of autocorrelation functions at the second irradiation position. Also, until the reference function and comparison target functions at each irradiation position are acquired, that irradiation position is continuously irradiated with the inspection light L1 from the light irradiation part 3.

As described above, after the pre-measurement and the main measurement at the first irradiation position have been ended, the sample analyzer moves the measurement cell 2 to the second irradiation position. Then, in the same manner as that in Steps S2 and S3, the premeasurement and the main measurement are performed at the second irradiation position. After that, the same processing steps are repeated to the N-th irradiation position (Step S12).

In addition, the reference function and comparison target functions set at each irradiation position are adapted to be displayable on the same screen or mutually different screens of the unillustrated display part. Also, the reference function set at each irradiation position may be included in the calculation of the local average correlation function together with the below-described comparison target functions.

After that, the sample analysis part 54 averages the predetermined number of comparison target functions acquired at each irradiation position on an irradiation position basis to calculate the local average correlation function (Step S13). Subsequently, the sample analysis part 54 takes the ensemble average of the local average correlation functions at the respective irradiation positions to thereby calculate the ensemble average correlation function (Step S14). The sample analysis part 54 uses the ensemble average correlation function to analyze the structure and physical properties of the sample (Step S15).

The sample analyzer 100 configured as described can produce the following effects.

That is, since the sample analyzer 100 of the present embodiment analyzes the sample using the comparison target functions of which the displacement amounts from corresponding ones of the reference functions are determined to be within the predetermined range, inappropriate autocorrelation functions such as specific autocorrelation functions and autocorrelation functions affected by foreign bodies can be eliminated to accurately analyze the sample.

Since the autocorrelation function determination part 53 determines comparison target functions at the respective points using the reference functions respectively corresponding to the multiple points, the appropriate autocorrelation functions (the comparison target functions of which the displacement amounts are within the predetermined range) at the respective points can be obtained to accurately analyze the sample.

Since the reference function setting part 52 sets the reference functions using the same sample as that used when obtaining comparison target functions, the reference functions suitable for the sample can be prepared, and therefore the more appropriate autocorrelation functions (the comparison target functions of which the displacement amounts are within the predetermined range) can be obtained to accurately analyze the sample.

Further, since in the present embodiment, the pre-measurement and the main measurement are continuously performed at each irradiation position, an irradiation position at the time of the premeasurement and an irradiation position at the time of the main measurement can be made coincident with each other, and therefore the measurement can be performed at the position before a temporal change occurs in the sample gel or the temporal change does not increase so much.

Note that the present invention is not limited to the above-described embodiment.

For example, the above-described embodiment continuously performs the pre-measurement and the main measurement at each irradiation position, but may be adapted to set reference functions at the multiple irradiation positions in the pre-measurement and then in the main measurement, acquire comparison target functions at the multiple irradiation positions.

Also, the above-described embodiment repeats the step of acquiring one comparison target function at each irradiation position and then determines the comparison target function until the number of appropriate comparison target functions reaches the predetermined number, but may be adapted to acquire multiple comparison target functions at each irradiation position and then determine the multiple comparison target functions.

Further, the above-described embodiment acquires the multiple appropriate comparison target functions at each irradiation position, but may be adapted to acquire one appropriate comparison target function. In such a case, it is conceivable to acquire one comparison target function at each irradiation position, and when the displacement amount of the comparison target function is out of the predetermined range, shift to the acquisition of a comparison target function at the next irradiation position. Also, one common reference function may be used at the multiple irradiation positions.

In addition, the above-described embodiment sets each of the reference functions using the same sample as that used when obtaining corresponding comparison target functions, but may set that reference function using a sample (e.g., a reference sample) serving as another reference, using a reference function having been obtained in the past, or using a reference function obtained by calculation such as simulation.

The above-described embodiment is one that sets the upper limit reference function and the lower limit reference function for each of the reference functions, but may be one that sets only the upper limit reference function and determines whether or not a comparison target function is smaller than the upper limit reference function, or sets only the lower limit function and determines whether or not a comparison target function is larger than the lower limit function.

The sample in the above-described embodiment is the gel, but may be one in which particulate matter (e.g., particles, protein, or nanofibers) is dispersed in a solvent, one that is a mixture of a liquid phase and a vapor phase and in which bubbles are dispersed, or one (emulsion) in which in one liquid, the other liquid is dispersed in a particulate form.

In such a case, when the sample contains foreign matter or foreign bodies such as bubbles of abnormal size and/or emulsion, an inappropriate comparison target function caused by such foreign bodies can be eliminated by being compared with a corresponding one of the reference functions.

Besides, the present invention is not limited to any of the above-described embodiment and variations, but can be variously modified without departing from the scope thereof.

REFERENCE SIGNS LIST

100: Sample analyzer
2: Measurement cell
3: Light irradiation part
4: Light detecting part
5: Information processing device
51: Autocorrelation function calculation part
52: Reference function setting part
53: Autocorrelation function determination part
54: Sample analysis part
6: Irradiation position changing mechanism

The invention claimed is:

1. A sample analyzer, comprising:
a detector detecting scattered light from a sample that is irradiated by an inspection light;
a processing device configured to:
obtain a reference function comprising an autocorrelation function of a reference signal as a function of a delay time;
calculate, with an autocorrelation function calculation part, autocorrelation functions of detection signals as a function of a delay time, the detection signals obtained by irradiating a sample with inspection light, to obtain a plurality of comparison target functions;
determine, with an autocorrelation function determination part, whether or not a displacement amount of each of the plurality of comparison target functions from the reference function is within a predetermined range over a predetermined delay time range;
analyze, with a sample analysis part, the sample using ones of the plurality of comparison target functions of the sample that have displacement amounts determined by the autocorrelation function determination part to be within the predetermined range over a predetermined time range; and
discard ones of the plurality of comparison target functions having displacement amounts determined by the autocorrelation function determination part to be outside of the predetermined range over the predetermined delay time range.

2. The sample analyzer according to claim 1, wherein
the processing device is configured to obtain the reference function by measuring a reference sample different from the sample.

3. The sample analyzer according to claim 1,
the sample analyzer being one that analyzes the sample by irradiating multiple points of the sample with the inspection light, wherein
the autocorrelation function determination part of the processing device uses a reference function corresponding to each of the multiple points to determine a comparison target function at that point.

4. The sample analyzer according to claim 3,
the sample analyzer performing pre-measurement adapted to obtain the reference function from the sample, and after the premeasurement, main measurement adapted to obtain the comparison target function from the sample.

5. The sample analyzer according to claim 1, wherein
the sample is gel, and
the processing device is configured to analyze, with the sample analysis part, structure of the gel or hardness of the gel.

6. The sample analyzer according to claim 1, comprising:
a measurement cell adapted to contain the sample; and
an irradiation position changing mechanism adapted to change an irradiation position of the inspection light with respect to the measurement cell.

7. A recording medium storing a sample analysis program used for a sample analyzer that calculates an autocorrelation function from a detection signal obtained by irradiating a sample with inspection light, and from the autocorrelation function, analyzes the sample, the sample analysis program instructing a computer to implement the following steps using the sample analyzer:
obtaining a reference function comprising an autocorrelation function of a reference signal as a function of a delay time;
calculating autocorrelation functions from detection signals as a function of delay time, the detection signals obtained by irradiating a sample with inspection light, to obtain a plurality of comparison target functions;
determining whether or not a displacement amount of each of the plurality of comparison target functions from the reference function is within a predetermined range over a predetermined delay time range; and
analyzing the sample using ones of the plurality of comparison target functions of the sample with displacement amounts determined by the autocorrelation function determination part to be within the predetermined range over a predetermined time range; and
discarding ones of the comparison target functions having displacement amounts determined to be outside of the predetermined range over the predetermined delay time range.

8. The sample analyzer according to claim 1, wherein
the processing device is configured to obtain the reference function by performing measurement with the use of the sample.

9. The sample analyzer according to claim 1, wherein the processing device analyzes the sample using an average correlation function of the ones of the plurality of comparison target functions of the sample that have displacement amounts within the predetermined range over a predetermined time range.

\* \* \* \* \*